United States Patent [19]

Schwalm et al.

[11] Patent Number: 4,483,056

[45] Date of Patent: Nov. 20, 1984

[54] TOOL FOR CLOSING PIPE COUPLINGS

[75] Inventors: Dieter Schwalm, Bielefeld; Rainer Neumann, Herten, both of Fed. Rep. of Germany

[73] Assignees: Kurt O. Moebius; Hackforth GmbH & Co. KG, both of Herne, Fed. Rep. of Germany; a part interest

[21] Appl. No.: 397,836

[22] Filed: Jul. 13, 1982

[30] Foreign Application Priority Data

Jul. 24, 1981 [DE] Fed. Rep. of Germany ....... 3129204

[51] Int. Cl.[3] .............................................. F16L 35/00

[52] U.S. Cl. ......................................... 29/237; 29/252

[58] Field of Search ................. 29/252, 237, 280, 268, 29/432, 525, 283.5; 285/39, 382.1–382.7, 382

[56] References Cited

U.S. PATENT DOCUMENTS 3,270,406 9/1966 Gorman et al. ........................ 29/237
3,299,496 1/1967 Christensen ........................... 29/237
4,189,817 2/1980 Moebius ................................ 29/237
4,257,135 3/1981 Moebius ................................ 29/237
4,345,361 8/1982 Baumann .............................. 29/252

FOREIGN PATENT DOCUMENTS 23005 4/1981 European Pat. Off. .............. 29/237

*Primary Examiner*—Robert C. Watson
*Attorney, Agent, or Firm*—Lyon & Lyon

[57] ABSTRACT

The invention relates to a tool for closing pipe couplings between metal pipes (4, 5), the end of one pipe (4) being closingly engageable in a widened terminal part (6) of the other pipe (5), a sleeve ring (7) being pressed axially on to the widened part over the end face thereof. According to the invention, two pressing jaws (1, 2) movable towards and away from one another parallel to the pipe axes are provided and are forked in the pipe engaging zone, the sleeve ring (7) being retained in one pressing jaw (1) while the other pressing jaw (2) engages by means of tongs-action clamping jaws (10) with the funnel-shaped constriction between the widened part of the pipe and the unwidened part thereof. The outer ends of the clamping jaws (10) take the form of half-shells (12) which are in laterally inverted relationship to one another and whose inner shell surfaces are adapted to the pipe periphery. Preferably, a pressure-medium-operated actuating element (34, 35) is provided for operative actuation of the pressing jaws (1, 2).

14 Claims, 6 Drawing Figures

TOOL FOR CLOSING PIPE COUPLINGS

The invention relates to a tool for closing pipe couplings between metal pipes, the end of one pipe being closingly engageable in a widened terminal part of the other pipe, a sleeve ring being pressed axially on to the widened part over the end face thereof.

In tube couplings of this kind, a strong connection between the telescope pipe ends is produced by the pipe walls being compressed radially and, therefore, clamped together by means of an axially pressed-on sleeve ring. The same is usually so devised that its inside generated surface has at least a first conical zone, the same merging into a cylindrical zone which in turn merges into a second conical zone. The diameter of the cylindrical portion and of the second conical portion of the sleeve ring is smaller than the outer diameter of the widened pipe end, the difference between the diameters depending upon the nature of the material and upon the size of the pipes to be coupled together. Consequently, pressing the sleeve ring on to the pipe end produces inwardly directed radial forces which constrict the widened part of the pipe and thus clamp the same tightly to the inner pipe. A durable mechanically strong and leakproof joint can thus be provided between metal pipes.

It is the object of the invention to provide a tool enabling the sleeve ring to be pressed on to the widened part of the pipe readily and rapidly in tube couplings of this kind without the resulting reaction forces damaging or distorting the pipe surfaces. Another requirement is that the tool be embodied by constructionally simple elements and be easy to manipulate.

The invention accordingly provides a tool for closing pipe couplings between metal pipes, the tool being distinguished by the following features:

At least two pressing jaws movable towards and away from one another are mounted on a guide extending parallel to the pipe axis and are forked in the pipe-engaging zone to enable the tool to be so engaged on the pipes to be joined together as to extend transversely to the axis thereof;

On one of the two pressing jaws a forked part adjacent the other such jaw is widened in accordance with the diameter of the sleeve ring, the transition between the widened part and the unwidened part being in the form of a shoulder which extends perpendicularly to the pipe axis and which serves as axial abutment for the sleeve ring;

The other pressing jaw comprises a static outer forked part and an inner forked part formed by two tongs-action clamping jaws;

The outer ends of the clamping jaws are half-shells disposed in laterally inverted relationship to one another, the inner shell surfaces being adapted to the pipe periphery;

The half-shells are adapted on the inside edge to the wall shape of the conical transition between the unwidened part and the widened part of the pipe;

An actuating pin disposed parallel to the direction in which the pressing jaws are guided is secured to the pressing jaw having the static forked part and acts during the closing movement of the pressing jaws to close the clamping jaws against a resilient restoring force, e.g. a spring, and A mechanical or hydraulic or pneumatic element is provided to actuate the pressing jaws.

What distinguishes this tool are two pressing jaws which are movable relatively to one another parallel to the pipe axis and which are forked in the pipe-engaging zone, the sleeve ring being retained in one pressing jaw while the other pressing jaw abuts by way of its tongs-action clamping jaws the narrowing zone between the widened part and the unwidened part of the pipe. The use of moving clamping jaws ensures a closed distribution of the force over the pipe periphery and, therefore, uniform distribution of the resulting pressures over the entire periphery of the pipe, thus obviating distortions due to local excessive surface pressures.

Conveniently, to guide the pressing jaws a guide rod is secured to one of the two pressing jaws and is guided in a matching recess in the other pressing jaw. The guide rod can be of circular or some other cross-section. Conveniently, a compression spring tending to keep the pressing jaws open is disposed therebetween.

According to another feature of the invention, the diameter of the inner shell surfaces of the half-shells is approximately 0.1 mm greater than the outer diameter of the pipe to be connected. This feature ensures zthat the half-shells do not stick or jam accidentally on the pipe.

Conveniently, the arms of the clamping jaws are two-armed levers which are mounted pivotally, e.g. on pins, on the associated pressing jaw.

According to another feature of the invention, the actuating pin has a conical tip which, as the pressing jaws move towards one another, penetrates between the clamping-jaw arms remote from the half-shells and thus produces the closing movement of the clamping jaws. Conveniently in this case too, a compression spring is disposed between the clamping jaws and tends to move the same apart from one another.

Another advantageous feature serves to subdivide the closing movement of the clamping jaws into an initial phase and a brief final phase. To this end, the clamping jaws are movable between two end positions parallel to the pipe axis and have, in the zone adjacent the outer forked part and near to the free ends, projections having wedge surfaces which engage corresponding wedge surfaces on the arms of the outer forked part in the final phase of the closing movement of the pressing jaws and produce complete closure of the clamping jaws. To ensure that the limitedly mobile clamping jaws automatically resume their initial position in the inoperative position, a resilient bearing or support in the form, for instance, of a spring is provided for each clamping jaw.

Complete closure of the clamping jaws can be devised in some other way. For instance, the conical tip of the actuating pin can merge into a cylindrical portion responsible for the first phase of the closing movement and merging into a second conical portion which produces complete closure of the clamping jaws in the final phase of the closing movement of the pressing jaws.

A tool in accordance with the invention has considerable advantages in practical use. Besides being easy to manipulate, it has the advantage of enabling pipe couplings of this kind to be produced rapidly and, therefore, cheaply.

The invention will be described in greater detail hereinafter with reference to embodiments shown in the drawings wherein.

Figure 1:
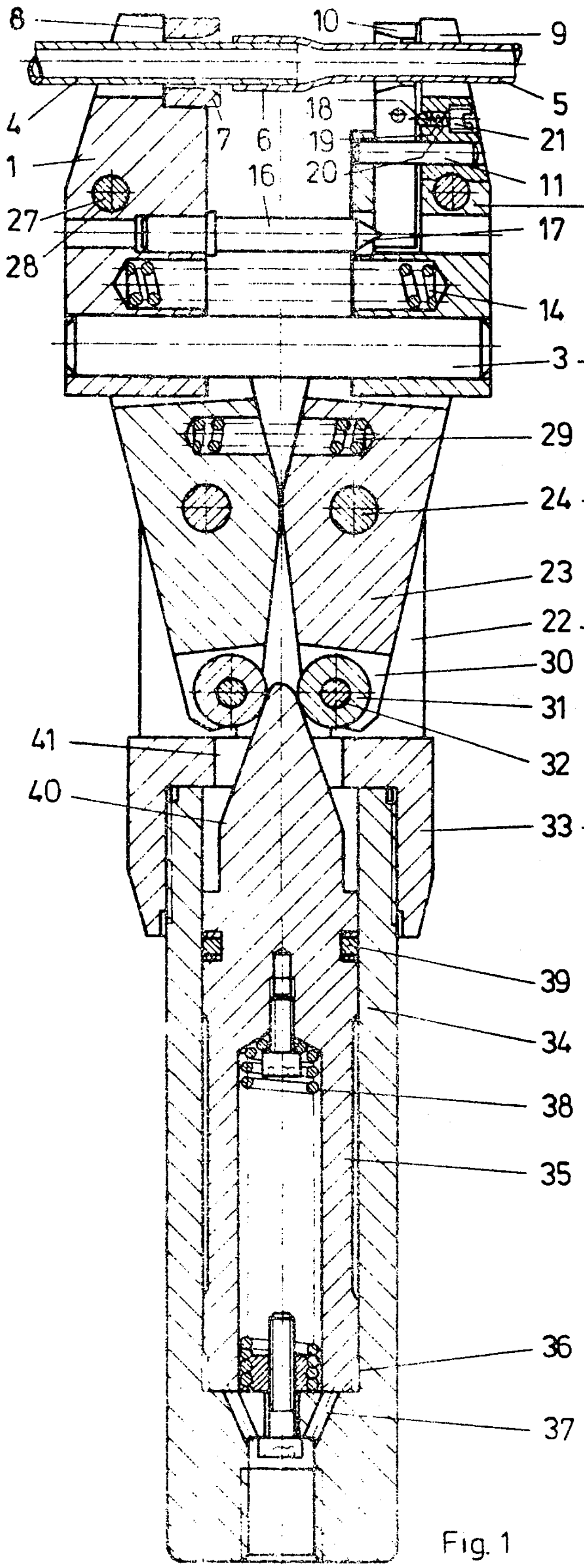
FIG. 1 is a view in side elevation, in a section in the centre-plane, of a tool and its actuating element.

The tool shown is made of appropriate materials such as metal or steel or the like. It comprises two pressing jaws 1, 2 which are adpated to move parallel to one another. Guidance is by means of a cylindrical guide rod 3 which is non-movably secured in a bore in one pressing jaw, e.g. the jaw 1, and is guided slidingly in a bore in the other jaw 2. At their free ends the jaws 1, 2 are devised as like-directed substantially U-shaped forks whose apertures are adapted to receive the metal pipes it is required to interconnect. Pipe 5 has a widened terminal portion 6 into which the end of pipe 4 is introduced closingly. A tight connection between the two pipes 4, 5 is provided by means of a sleeve ring 7 which is pressed on to the widened portion 6 of pipe 5 over the end face thereof.

The pressing-on side of the opening of sleeve 7 is conical, to facilitate the entry into such opening of the widened terminal portion 6 of pipe 5. The conical portion is followed by a cylindrical portion whose internal diameter is smaller than the outer diameter of the widened portion 6 in its initial state, the difference between the diameters depending upon the nature of the material used and upon the required clamping. The cylindrical portion is followed by a second conical portion at the rear end of sleeve ring 7.

The fork of jaw 1 is subdivided into an inner forked portion and an outer forked portion. The width of the inner forked portion is such that the sleeve ring 7 can be engaged in the latter portion substantially without clearance; the inner bearing region is semicircular and its diameter corresponds substantially to the outer diameter of sleeve ring 7. In its rear forked portion the fork opening has an internal width less than in the inner portion but greater than the outer diameter of the pipe 4. The transition from the inner forked portion to the outer forked portion takes the form of a shoulder 8 which is perpendicular to the pipe axis and which serves as an axial abutment for ring 7.

The pressing jaw 2 comprises a stationary outer forked portion 9 and two tongs-action clamping jaws 10. The fork opening of the outer forked part 9 corresponds to the forked opening in the outer part of the pressing jaw 1. The clamping jaws 10 are two-armed levers, each clamping jaw 10 being mounted on a pin 11 retained statically by way of its ends in bores in the pressing jaw 2. The outer ends of the clamping jaws 10 take the form of half-shells 12 which are disposed in laterally inverted relationship to one another and whose inner shell surfaces are adapted to the periphery of pipe 5. To obviate accidental sticking or jamming of the clamping jaws 10 on the pipe 5, the inner diameter of the circular aperture defined by the half-shells is approximately 0.1 mm greater than the outer diameter of the pipe 5.

The inner shell surfaces of the half-shells 12 are so shaped in a zone 13 near the pressing jaw 1 that their contour corresponds to the shape of the wall at the transition between the cylindrical pipe 5 and the widened pipe portion 6. The closed clamping jaws 10 therefore form a positive abutment for the funnel-shaped part 6, such abutment uniformly receiving the axial pressure necessary to press ring 7 on to the widened portion 6.

Figure 2:
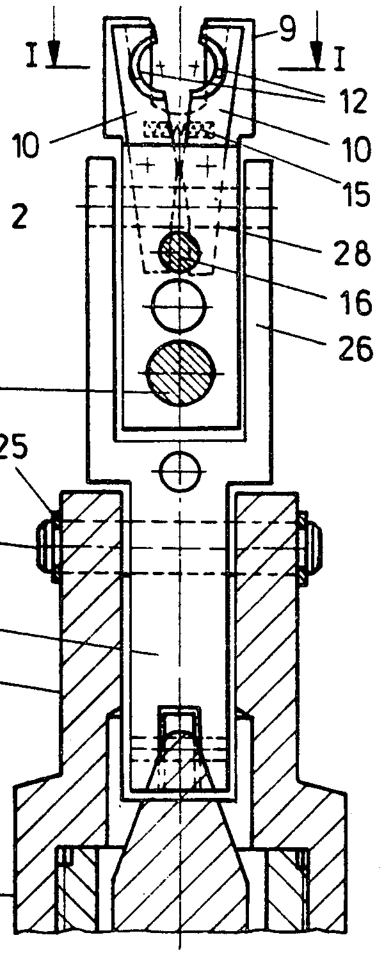
FIG. 2 is a sectioned end view of the tool with the actuating element shown in partial elevation.

Disposed between the pressing jaws 1 and 2 is a helical compression spring 14 whose ends are received in blind bores in the pressing jaws 1, 2 and whose spring force tends to retain the same in the open position shown in the drawings. Similarly, a compression spring 15 is associated with the clamping jaws 10 to separate the same. When the pressing jaws 1, 2 move towards one another, the clamping jaws 10 simultaneously close automatically. This effect is produced by an actuating pin 16 which is rigidly secured to the pressing jaws 1 and which has a conical tip 17; when the pressing jaws 1, 2 are pressed together, the tip 17 penetrates into the gap between the inner arms of the clamping jaws 10, which take the form of two-armed levers, the tip pressing the latter arms apart from one another. Once the cylindrical portion of the pin 16 penetrates, the clamping jaws 10 are in the substantially completely closed state. The remainder of the closing movement takes place shortly before the termination of the closing movement of the pressing jaws 1, 2. In the embodiment shown in FIGS. 1 to 3 this is achieved as follows:

The clamping jaws 10 are movable on the pins 11 between two end positions. In the inoperative position the jaws take up the end position in which they are relatively near the pressing jaw 1, as shown in FIG. 1. To move the jaws 10 into their other end position, they have to overcome a resilient restoring force produced, in the embodiment, by a spring. Engaging with each clamping jaw 10 on the side distal from the pressing jaw 1 is a ball 18 biassed by a compression spring 19 which is disposed in a bore 20 and which bears at its other end on a grub screw 21.

Figure 3:
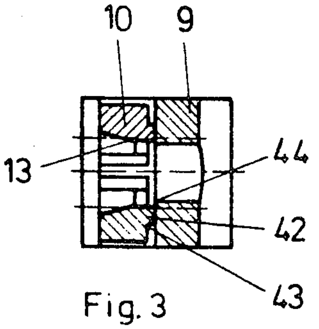
FIG. 3 is a cross-section through the pressing jaw which comprises the clamping jaws, the view being in the plane of the line I—I.

As the cross-section of FIG. 3 shows, projections 42 which have inclinedly outwardly extending wedge surfaces 43 are provided on the clamping jaws 10 near the fork arms and on the side distal from the pressing jaw 1. Shortly before the clamping jaws 10 reach their closed position, they engage with corresponding wedge surfaces 44 on the static arms of the outer forked part 9. Due to the axial pressure applied to the jaws 10 when the ring 7 is pressed on, the jaws 10 move from the initial position of FIG. 1 into their other end position, a relative movement occurring between the contacting surfaces 43 and 44 and leading to the applications to the clamping jaws 10 of a resulting force tending to close the same, thus achieving final closure of the clamping jaws 10.

After a coupling has been effected, the beginning of the opening movement of the pressing jaws 1, 2 causes a slight opening of the clamping jaws 10, since the latter are returned to their initial position, upon cessation of the axial pressure, by the effect of the restoring forces originating from the springs 19. The clamping jaws 10 open fully near the end of the opening movement of the pressing jaws 1, 2 when the control pin tip 17 ceases to act on the inner arms of the clamping jaws 10.

A mechanical or hydraulic or pneumatic actuating element can be used to produce the closing movement of the pressing jaws 1, 2. The drawings show the use of a pressure-medium-operated actuating element, with the use of a reciprocating facility. The actuating element comprises a forked element 22 in which two two-armed levers 23 are pivotally mounted on pins 24 retained at their free ends, without provision for axial movement, in bores in the arms of the forked part 22. The pins 24 are secured by circlips 25 received in peripheral grooves.

Each two-armed lever 23 is a fork at its free ends. The forks 26 at the outer ends each receive in their fork opening a clamping jaw 1 or 2. A pivotable connection is provided by pins 27 which each extend through a bore 28 in the associated pressing jaw 1 or 2 and which are mounted at their outer ends in bores in the fork 26. The pins 27 can be disposed either in the bores in the pressing jaws 1 or 2 or in the bores in the fork 26 in non-rotatable manner, for instance, as a result of a shrink connection. As FIG. 1 shows, a compression spring 29 is disposed between the outer arms of the levers 23 and tends to keep the same in the extended or expended position. Guide rolls 31 are rotatably mounted on pins 32 at the inner ends of the levers 23 between the forks 30.

The shoulder element of the fork 22 is a cylindrical dished member 33 which is placed on the end of a cylinder 34 of a reciprocating actuator and is operatively connected to the cylinder 34. A piston 35 is guided in the cylinder 34 for axial movement and its rearward piston surface bounds a pressure medium chamber 36 adapted to be supplied with external pressure medium by way of feed ducts 37. When the piston 35 does not experience the action of pressure medium, it is retained in its initial position by a tension spring 38 disposed in a central bore. The piston has somewhere on it a ring seal 39 serving to seal the pressure medium chamber 36. At its outer end the piston 35 merges into a conical pin 40 which extends through an aperture 41 in the base of the dished member 33, the tip of the pin 40 projecting from the base. The tip extends into a gap between the two guide rolls 31 and makes contact therewith.

To operate the tool, pressure medium is supplied to the chamber 36. The piston moves forwards, the conical pin 40 pushing the guide rolls 31 outwardly, so that the outer arms of the levers 23 pivot in the sense of a closure. Termination of the operative movement of the piston 35 can be controlled by a pressure-limiting valve or by other appropriate elements. When the pressure in the chamber 36 decreases, the spring 38 returns the piston 35 to its initial position. Because of the return of the pin 40, the return springs 29, 14 act on the levers 23 in the sense of an opening until the levers pivot back into their initial position. The tool is then ready for the next coupling operation.

Figure 4:
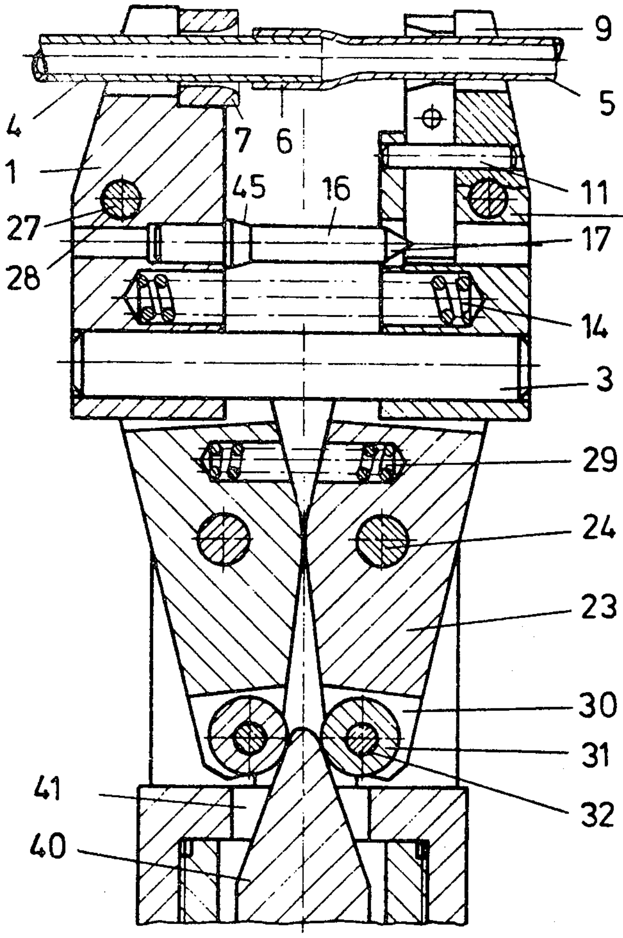
FIG. 4 is a side view of a variant of the tool with a partial elevation of the actuating element, the view being in a section on the centre-plane.
Figure 5:
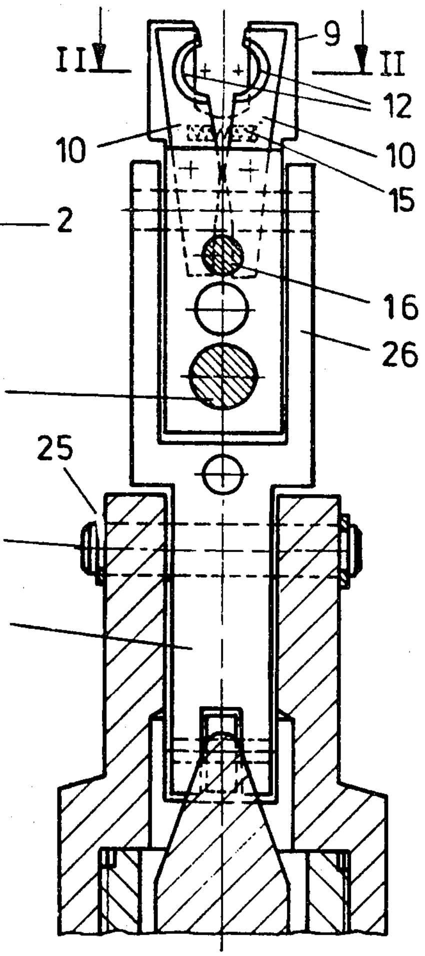
FIG. 5 is an end view of the tool and a partial elevation of the actuating element, also in section.
Figure 6:
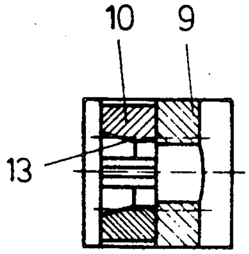
FIG. 6 is a cross-section through the pressing jaw comprising the clamping jaws in the plane of the line II—II.

In the embodiment shown in FIGS. 4–6, other constructional means are used to produce the terminal phase of the closing movement of the clamping jaws 10. In other respects the embodiment is identical to the embodiment shown in FIGS. 1–3, and so like elements have the same reference numbers as in the first embodiment.

Unlike the first embodiment, the clamping jaws 10 cannot move axially. The pin 16 has a conical tip followed by a cylindrical portion. Disposed at the end thereof is a second conical portion 45, the same contacting the inner arms of the clamping jaws 10 only immediately before the pressing jaws 1, 2 reach their closed position. Penetration of the second conical portion 45 into the gap between the inner arms produces further separation thereof and, therefore, complete closure of the clamping jaws 10.

We claim:

1. A tool for closing pipe couplings between metal pipes, the end of one pipe being closingly engageable in a widened terminal part of the other pipe, a sleeve ring being pressed axially onto the widened part over the end face thereof, characterised by the following features:

at least two pressing jaws (1, 2) movable towards and away from one another are mounted on a guide extending parallel to the pipe axis and are forked in the pipe-engaging zone to enable the tool to be so engaged on the pipes (4, 5) to be joined together as to extend transversely of the axis thereof;

on one of the two pressing jaws (1 or 2) a forked part adjacent the other such jaw is widened in accordance with the diameter of the sleeve ring (7), the transition between the widened part and the unwided part being in the form of a shoulder (8) which extends perpendicularly to the pipe axis and which serves as axial abutment for the sleeve ring (7);

the other pressing jaw (2) comprises a static outer forked part (9) and an inner forked part formed by two tongs-action clamping jaws (10);

the outer ends of the clamping jaws (10) are half-shells (12) disposed in laterally inverted relationship to one another, the inner shell surfaces being adapted to the pipe periphery;

the half-shells (12) are adapted on the inside edge (13) to the wall shape of the conical transition between the unwidened part and the widened part of the pipe;

an actuating pin (16) disposed parallel to the direction in which the pressing jaws (1, 2) are guided is secured to the pressing jaw (1) having the static forked part and acts during the closing movement of the pressing jaws (1, 2) to close the clamping jaws (10), and means provided to actuate the pressing jaws.

2. A tool according to claim 1, characterized in that said guide extending parallel to the pipe axis includes a guide rod (3) secured to one of the two pressing jaws and guided in a matching recess in the other pressing jaw.

3. A tool according to claim 1, characterised in that a compression spring (14) tending to keep the pressing jaws (1, 2) open is disposed therebetween.

4. A tool according to claim 1, characterised in that the diameter of the inner shell surfaces of the half-shells (12) is approximately 0.1 mm greater than the outer diameter of the pipe (5) to be connected.

5. A tool according to claim 1, characterised in that the clamping jaws (10) are comprised of two-armed levers which are mounted pivotally by pins (11) on the associated pressing jaw (2).

6. A tool according to claim 5, characterised in that the actuating pin (16) has a conical tip (17) which, as the pressing jaws (1, 2) move towards one another, penetrates between the clamping-jaw arms remote from the half-shells (12) and thus produces the closing movement of the clamping jaws (10).

7. A tool according to claim 1, characterised in that a compression spring (15) is disposed between the clamping jaws (10) and tends to move the same apart from one another.

8. A tool according to claim 1, characterised in that the clamping jaws (10) are movable between two end positions parallel to the pipe axis and have, in the zone adjacent the outer forked part (9) and near to the free ends, projections (42) having wedge surfaces (43) which engage corresponding wedge surfaces (44) on the outer forked part (9) in the final phase of the closing movement of the pressing jaws (1, 2) and produce complete closure of the clamping jaws (10).

9. A tool according to claim 8, characterised in that means are provided for causing a resilient restoring force on each clamping jaw (10).

10. A tool according to claim 1, characterised in that the actuating pin (16) has a conical tip (17) which merges into a cylindrical portion, the same merging into a second conical portion (45) which produces complete closure of the clamping jaws (10) in the final phase of the closing movement of the pressing jaws (1, 2).

11. A tool for closing metal pipe couplings of the type having the end of one pipe closingly engageable in a widened terminal part of the other pipe and a sleeve ring being pressed axially on to the widened part over the end face thereof, the tool including; a pair of pressing jaws and means supporting said jaws for movement towards and away from one another on the pipe axis, one of said pressing jaws having a shoulder which extends perpendicularly to the pipe axis and which serves as axial abutment for the sleeve ring, the other said pressing jaw having a pair of clamping jaws with half-shell portions disposed in laterally inverted relationship to one another and the inner shell surface being adapted to the pipe periphery including the transition between the unwidened part and the widened part of the pipe, means mounted on said pressing jaws and actuated by the closing movement between the pressing jaws to close the clamping jaws onto the pipe, and means for causing the closing movement of the pressing jaws.

12. A tool according to claim 11 in which the clamping jaws (10) are two-armed levers which are pivotally mounted on the associated pressing jaw.

13. A tool according to claim 12 in which an actuating pin is mounted on the said one pressing jaw and has a conical tip which, as the pressing jaws move towards one another, penetrates between the clamping-jaw arms remote from the half-shells and thus produces the closing movement of the clamping jaws.

14. A tool according to claim 11 in which means are provided for engaging said clamping jaws in the final phase of the closing movement of the pressing jaws and produces complete closure of the clamping jaws on the pipe.

* * * * *

UNITED STATES PATENT AND TRADEMARK OFFICE

CERTIFICATE OF CORRECTION

PATENT NO. : 4483056

DATED : November 20, 1984

INVENTOR(S) : Dieter Schwalm and Rainer Neumann

It is certified that error appears in the above—identified patent and that said Letters Patent is hereby corrected as shown below:

Column 2, line 22 change "zthat" to --that--.

Signed and Sealed this

*Seventh* Day of *January 1986*

[SEAL]

*Attest:*

DONALD J. QUIGG

*Attesting Officer* *Commissioner of Patents and Trademarks*